United States Patent Office 3,594,253
Patented July 20, 1971

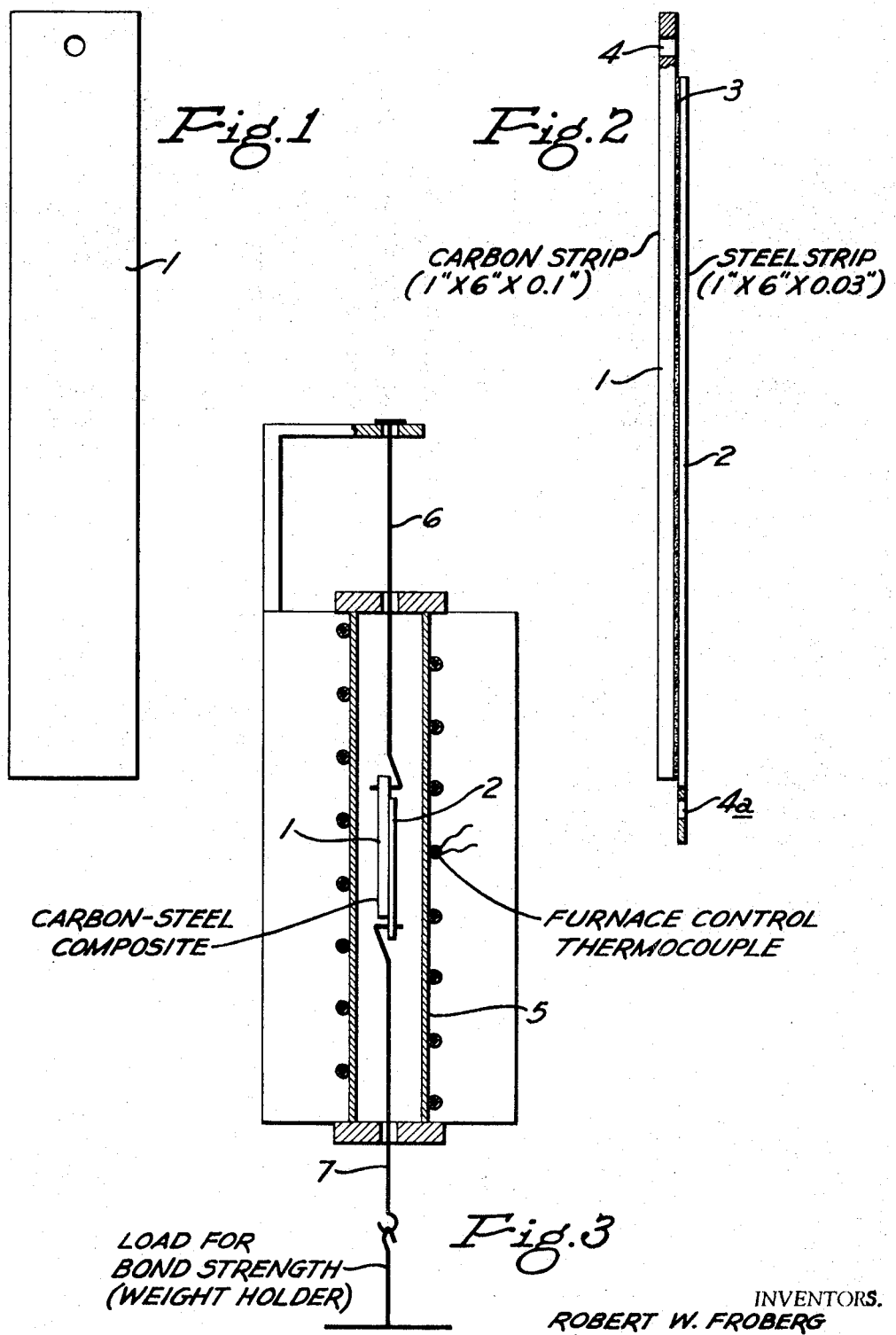

3,594,253
BONDING CARBON TO STEEL
Robert W. Froberg, Walter G. Krellner, and Dolores A. Moore, St. Marys, Pa., assignors to Stackpole Carbon Company, St. Marys, Pa.
Filed May 15, 1968, Ser. No. 729,255
Int. Cl. C09j 1/00
U.S. Cl. 156—325          4 Claims

ABSTRACT OF THE DISCLOSURE

Steel and carbon members are bonded together by a cement formed in situ between the members by reaction of orthophosphoric acid and an oxygen-containing compound of cadmium or of silver or an oxygen compound of both boron and zinc. In the preferred embodiment the cement has dispersed through it finely divided silica. The bonds between the two members remain desirably strong at elevated temperatures.

BACKGROUND

For some purposes it is desirable to make use of the properties of carbon or graphite members, hereinafter referred to for brevity as carbon members, but advantage cannot be taken of those properties alone because of brittleness. It has been proposed to back carbon articles with steel or other ferrous metal to confer strength but this requires clamping or other mechanical means which necessitates manual or automatic application, and the mechanical means used may be of such size, shape or location as to interfere with the use of the assembly, or be otherwise undesirable.

Attempts have been made to overcome the foregoing problems by using various phosphates to bind carbon to steel but without success. For instance the phosphates did not wet the carbon or the steel, or they corroded the metal during curing or firing. In other cases they softened at so low a temperature that the assembly could not be used at elevated temperatures, as is desirable for some purposes, and some phosphates when fired did not form a continuous phase between the members.

It is among the objects of this invention to provide a simple and easily practiced method of bonding carbon and steel members to provide composites having satisfactory bond strength at elevated temperatures whereby advantage may be taken of the properties of the individual members.

Another object is to provide articles of carbon and steel bonded in accordance with the foregoing object.

Other objects will appear from the following description.

In accordance with the invention carbon and steel members are bonded together by applying to the surface of at least one of them a composition of orthophosphoric acid ($H_3PO_4$) and a member of the group oxygen-containing compounds of cadmium or silver or of boron and zinc. The coated members are placed in contact and the assembly is heated so that the phosphoric acid reacts with the oxygen-containing compound to form cadmium phosphate, silver phosphate or zinc borophosphate, as the case may be. Excess acid over that stoichiometrically needed to form the phosphate is volatilized or decomposed and the two parts become bonded together by an insoluble cement of high melting point.

In the practice of the invention the acid and the metallic oxygen-containing compound are mixed in proportions to provide a composition the consistency or fluidity of which adapts its application to the members to be bonded together. A paint-like consistency permitting application by brush is suitable for most purposes. Usually there will be present at least a small excess of the acid over that stoichiometrically equivalent to the phosphate bond produced.

The parts may be rubbed together to assure good contact between and thorough coverage of the surfaces to be bonded. The assembly is then heated to cause the phosphate-forming reaction and cure the resulting cement. During the reaction the parts are desirable held together to avoid separation due to bubbling during the reaction and during expulsion of excess acid and volatile reaction products. This may be accomplished by clamping or by wrapping the assembly with wire.

The phosphates produced during curing of the joints are of high melting point so that the joints are adapted for use at elevated temperatures, as will appear from the following examples.

In the drawings FIGS. 1 and 2 are, respectively, front and side views of an assembly made in accordance with the invention; and FIG. 3 is a vertical elevation to a smaller scale of an apparatus for determining the bond strength of articles as shown in FIGS. 1 and 2.

Referring to the drawings, FIG. 1 shows a member 1 of carbon, suitably 6 inches long by 1 inch wide and 0.1 inch thick constituting one element of an assembly in accordance with the invention. FIG. 2 shows a steel strip 2, suitably 6 inches long by 1 inch wide and 0.030 inch thick, bonded to strip 1 by a layer of phosphate cement 3 in accordance with the invention. The extended ends of strips 1 and 2 are provided with holes 4 and 4a.

The assembly is suspended within a vertical electrically heated tube furnace 5 by a suspension member 6 having a hook engaging a hole 4 in member 1. From hole 4a in member 2 there is suspended means 7 for applying a load to the assembly, as shown.

The strips are overlapped as shown in FIGS. 1 and 2 so that the contact area between them is 4.5 square inches. The assembly is loaded progressively until the test specimen has been pulled apart. The bond strength is represented by the shear pressure required to pull the test specimen apart, as determined by the load required to do so divided by the contact area. It is to be observed that the maximum shear pressure which can be exerted on the sample is equal to the pressure at which the carbon strip breaks in tension.

In the tests reported hereinafter the tube furnace was heated electrically to bring the specimen to 1200° F. and the bond strength was determined at that temperature.

The invention will be explained further with reference to the following examples. In these tests the carbon member was graphite while the steel member was a low expansion steel sold as Carpenter 42 annealed. In this series of tests we were seeking a bond having strength at 1200° F.

Example I—Cadmium phosphate

This cement was made from 2.90 moles of CdO (as $CdCO_3$) and 3.48 moles of $P_2O_5$ (as 85 percent $H_3PO_4$). The cadmium carbonate in the form of powder was slowly mixed into the phosphoric acid at room temperature and after it was thoroughly dispersed the mixture was heated at 50° C. to dispel the carbon dioxide liberated. At this stage it had a paint-like consistency. Specimens made with this cement were judged to be too soft at 1200° F. but it appeared that the cement could be used at lower temperatures such as 800° to 1000° F. and thus be useful at such elevated temperatures.

Example II

In this example six parts by weight of cement I were thoroughly mixed with four parts by weight of fine silica dust (92 weight percent less than 44 microns diameter). Specimens were made for testing this combination as described above, and they were cured at 1450° F. for five minutes. When tested in the apparatus described the results for this cement at 1200° F. were 1.02, 1.03 and 1.17 lbs./in.²

The carbon strips used in this example when tested alone broke in tension when the load was equivalent to 2.9 lbs. per square inch shear pressure as defined above. Accordingly, the bond strength of the cement was equal to from 35 to 40 percent of the strength of the carbon material.

Example III—Zinc borophosphate

This cement was made from 0.25 mole ZnO as zinc nitrate, 0.2 mole $B_2O_3$ as ortho boric acid, and 1.0 mole $P_2O_5$ as 85 percent phosphoric acid. The powders were thoroughly mixed at room temperature and the mixture was heated to 100° C. After cooling the cement was in the form of a white slurry. As in the case of Example I it was found upon testing that this cement was not sufficiently strong at 1200° F. but it was believed that it would be useful at temperatures of the order of 800° to 1000° F. and therefore at an elevated temperature.

Example IV

Sixty-five parts by weight of Example III were thoroughly mixed with thirty-five parts by weight of the silica dust used in Example II. The cement filled with silica dust in this manner was applied to specimens and fired at 1450° F. for five minutes. When tested the shear pressure required to pull the strips apart at 1200° F. was 1.71 to 2.45 lbs. per square inch so that the bond strength at 1200° F. was from 59 to 85 percent of the strength of the carbon material.

Example V

Seventy parts by weight of the zinc borophosphate of cement IV were mixed with thirty parts by weight of the silica dust used in the preceding tests. Test specimens were prepared and cured at 1200° F. for five minutes. In this instance the carbon strips broke in tension showing that the bond strength of the filled zinc borophosphate cement at 1200° F. was at least 2.9 lbs. per square inch, or equal to the strength of the carbon.

Example VI—Silver phosphate

This cement was made from 0.147 mole $Ag_2O$ as silver nitrate and 0.38 mole $P_2O_5$ as 85 percent phosphoric acid. The silver nitrate powder was thoroughly mixed with acid at room temperature to produce a white slurry which was not heated before use. Tests were not conducted at 1200° F. but the cement was stiff at 800° F. thus placing it in the category of high temperature cements. Silica powder was added to this composition but did not keep it rigid at 1200° F. although it would be a rigid cement at lower temperatures, say 800° to 1000° F.

In these tests the curing temperature of 1200° F. was chosen because we were seeking a bond having maximum strength at that temperature. Other curing temperatures may be used, of course, depending on the result sought and the particular compositions used. Also, curing time may vary; in general, the higher the temperature the shorter the time needed to effect the cure.

Also, provided there is at least enough acid present to form the desired phosphate, there is nothing critical in the amount of excess acid present in the composition for it merely supplies the fluidity desired for proper application to the parts to be joined. Thus, in Example I there were 260 percent more moles of $P_2O_5$ than necessary to form cadmium orthophosphate, in Example IV the $P_2O_5$ excess was 660 percent, while in Example III the $P_2O_5$ was within 3 percent of that required to form the orthophosphate of zinc and boron.

The various metal oxides contained in the foregoing formulas may be supplied in a variety of forms, for instance as nitrates, acetates, sulfates, carbonates, or other salts reactive with phosphoric acid. Likewise, the proportion of metal oxide to phosphoric acid may be varied, and the proportion of silica dust may be modified, according to the desired degree of high temperature bond strength. Also other inorganic inert fillers, of which a variety are known, may be used instead of, or in combination with, silica.

A feature of these cements is that they are not affected by the differences in the thermal expansion of carbon and the steel used. This is demonstrated clearly by the fact that all specimens tested were thermally cycled between room temperature and 1200° F. or higher at least twice. In no case did bond failure result from those heat treatments. Carbon and this steel have, of course, different coefficients of linear expansion. Generally speaking, above 650° F. this steel expands about three times as much as carbon but this difference in expansion was not sufficient to cause bond failure a shown by the foregoing test results. However, the best results are to be had with steels the expansion of which is as close as reasonably possible to that of carbon.

In addition to maintenance of a useful strength at high temperatures and to indifference to the expansion differences between carbon and the steel used, these cements have the further important advantage that they all wet both the carbon and the steel.

The product made in accordance with the invention has utility where it is desired to make use of the properties of both steel and carbon, examples being turbine seals, steel reinforced graphite, and graphite bearings in steel reinforcing rings.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:
1. That method of bonding a steel member to a carbon member comprising applying to at least one of said members a composition of a material of the group oxygen-containing compounds of cadmium, oxygen-containing compounds of silver, and oxygen-containing compounds of zinc and boron, and orthophosphoric acid in an amount at least sufficient to form orthophosphate of said material, placing the members in contact with the cement and heating to form said phosphates and produce a bond having strength at elevated temperatures.

2. A method according to claim 1, the cement having dispersed through it a finely divided inert inorganic material.

3. A method according to claim 2, said inert inorganic material being silica.

4. A method according to claim 1, said material being oxygen containing compounds of zinc and boron in amounts whereby the orthophosphate formed is zinc borophosphate.

References Cited

UNITED STATES PATENTS

| | | | |
|---|---|---|---|
| 2,702,425 | 2/1955 | Thompson | 106—58 |
| 3,025,204 | 3/1962 | Heintz | 156—89 |
| 3,278,328 | 10/1966 | Okrent | 117—47 |
| 3,468,750 | 9/1969 | Pfeifer et al. | 161—191 |

CARL D. QUARFORTH, Primary Examiner

E. A. MILLER, Assistant Examiner

U.S. Cl. X.R.

156—89; 161—191, 207